United States Patent
Ye et al.

(10) Patent No.: US 9,535,480 B2
(45) Date of Patent: Jan. 3, 2017

(54) POWER COORDINATION SYSTEM FOR HYBRID ENERGY STORAGE SYSTEM

(71) Applicant: NEC Laboratories America, Inc., Princeton, NJ (US)

(72) Inventors: Yanzhu Ye, San Jose, CA (US); Ratnesh Sharma, Fremont, CA (US)

(73) Assignee: NEC Corporation (JP)

( * ) Notice: Subject to any disclaimer, the term of this patent is extended or adjusted under 35 U.S.C. 154(b) by 168 days.

(21) Appl. No.: 14/555,176

(22) Filed: Nov. 26, 2014

(65) Prior Publication Data
US 2015/0149799 A1 May 28, 2015

Related U.S. Application Data

(60) Provisional application No. 61/909,361, filed on Nov. 26, 2013, provisional application No. 61/975,335, filed on Apr. 4, 2014.

(51) Int. Cl.
| | |
|---|---|
| H02J 7/00 | (2006.01) |
| G06F 1/26 | (2006.01) |
| G06N 7/02 | (2006.01) |
| G06F 1/32 | (2006.01) |
| G05B 13/02 | (2006.01) |
| H02J 1/10 | (2006.01) |
| H02J 7/34 | (2006.01) |
| H02J 7/35 | (2006.01) |

(52) U.S. Cl.
CPC ............ *G06F 1/263* (2013.01); *G05B 13/0275* (2013.01); *G06F 1/3212* (2013.01); *G06N 7/02* (2013.01); *H02J 1/10* (2013.01); *H02J 7/345* (2013.01); *H02J 7/35* (2013.01)

(58) Field of Classification Search
CPC ....... Y02E 60/12; H02J 7/0054; H01M 10/44; H01M 10/46
USPC .......................................................... 320/103
See application file for complete search history.

(56) References Cited

U.S. PATENT DOCUMENTS

| | | | | |
|---|---|---|---|---|
| 2002/0041174 | A1* | 4/2002 | Purkey ................... | F02N 11/14 320/103 |
| 2004/0018397 | A1* | 1/2004 | Nagai ................... | H01M 10/44 429/7 |
| 2005/0112416 | A1* | 5/2005 | Sakakibara ........... | H02J 7/0014 429/9 |
| 2007/0159007 | A1* | 7/2007 | King .................... | B60L 11/1864 307/71 |
| 2008/0278221 | A1* | 11/2008 | Rowland ............... | H02J 7/0016 327/536 |
| 2010/0181828 | A1* | 7/2010 | Handa ...................... | B60L 7/16 307/9.1 |
| 2014/0095060 | A1* | 4/2014 | Heo .................... | B60L 11/1861 701/123 |
| 2014/0139191 | A1 | 5/2014 | Asghari et al. | |

OTHER PUBLICATIONS

Datta, M. et al., "A fuzzy based method for leveling output power fluctuations of photovoltaic-diesel hybrid power system," Renewable Energy, 2011, vol. 36, No. 6. (pp. 1693-1703).
Ise, T. et al., "A hybrid energy storage with a SMES and secondary battery," Applied Superconductivity, IEEE Transactions on, Jun. 2005, vol. 15, No. 2, (pp. 1915-1918).
Liu, X. et al., "Control of hybrid battery/ultra-capacitor energy storage for stand-alone photovoltaic system," Energy Conversion Congress and Exposition (ECCE), 2010 IEEE. (pp. 336-341).
Wee, K.W. et al., "Design of a renewable—hybrid energy storage power scheme for short-term power dispatch," Electric Utility Deregulation and Restructuring and Power Technologies (DRPT), 4th International Conference on, 2011. (pp. 1511, 1516).
Thounthong, P. et al., "Energy management of fuel cell/solar cell/supercapacitor hybrid power source," Journal of Power Sources, Jan. 2011, vol. 196, Issue 1. (pp. 313-324).
Zheng, Z. et al., "A control method for grid-friendly photovoltaic systems with hybrid energy storage units," Electric Utility Deregulation and Restructuring and Power Technologies (DRPT), 4th International Conference on, Jul. 2011 (pp. 1437-1440).

* cited by examiner

*Primary Examiner* — Arun Williams
(74) *Attorney, Agent, or Firm* — Joseph Kolodka

(57) ABSTRACT

A method of controlling power in a hybrid energy storage system that may include controlling power through the at least one battery storage element and the capacitor storage element using a multi-level power management system. In some embodiments, the multi-level power management system includes at least a long term battery management layer and a real time power management layer. The long term battery management layer can be for estimating and managing a life cycle for the battery. The real time power management layer can be for managing power sharing between the at least one battery storage element and the at least one capacitor storage element at each time instant dependent upon adjustments to battery performance based upon the long term battery management layer.

11 Claims, 17 Drawing Sheets

TABLE I: STATE OF CHARGE FOR BATTERY (SOC_BAT) IS POSITIVE BIG

| PHESS / SOC_UC | PB | | PS | | ZERO | | NS | | NB | |
|---|---|---|---|---|---|---|---|---|---|---|
| | Ibatt | dp | Ibatt | dp | Ibatt | dp | Ibatt | dp | Ibatt | dp |
| PB | ZERO | ZERO | ZERO | NS | NS | NS | NB | NB | NB | NB |
| PS | ZERO | ZERO | ZERO | ZERO | NS | ZERO | NS | NS | NS | NB |
| ZERO | ZERO | ZERO | ZERO | ZERO | ZERO | ZERO | ZERO | ZERO | ZERO | ZERO |
| NS | PS | PM | PS | PS | PS | PS | ZERO | PS | PS | PS |
| NB | PB | PB | PB | PM | PB | PS | ZERO | PB | PS | PB |

FIG 5.

TABLE II: STATE OF CHARGE FOR BATTERY (SOC_BAT) IS POSITIVE SMALL

| PHESS / SOC_UC | PB | | PS | | ZERO | | NS | | NB | |
|---|---|---|---|---|---|---|---|---|---|---|
| | Ibatt | dp | Ibatt | dp | Ibatt | dp | Ibatt | dp | Ibatt | dp |
| PB | ZERO | ZERO | ZERO | NS | NB | NM | NB | NB | NB | NB |
| PS | ZERO | ZERO | ZERO | ZERO | NS | NS | NS | NS | NS | NB |
| ZERO | ZERO | ZERO | ZERO | ZERO | ZERO | ZERO | ZERO | ZERO | ZERO | ZERO |
| NS | PS | PS | PS | PS | PS | PS | PS | PM | PS | PB |
| NB | PB | PB | PB | PB | PB | PM | PS | PS | PS | PS |

FIG 6.

TABLE III: STATE OF CHARGE FOR BATTERY (SOC_BAT) IS ZERO

| PHESS / SOC_UC | PB | | PS | | ZERO | | NS | | NB | |
|---|---|---|---|---|---|---|---|---|---|---|
| | Ibatt | dp | Ibatt | dp | Ibatt | dp | Ibatt | dp | Ibatt | dp |
| PB | ZERO | ZERO | ZERO | NS | NB | NS | NB | NM | NB | NB |
| PS | ZERO | ZERO | ZERO | ZERO | NS | ZERO | NS | NS | NS | NM |
| ZERO | ZERO | ZERO | ZERO | ZERO | ZERO | ZERO | ZERO | ZERO | ZERO | ZERO |
| NS | PS | PM | PS | PS | PS | ZERO | PS | PS | PS | ZERO |
| NB | PB | PB | PB | PM | PB | PS | PS | PS | PS | ZERO |

FIG 7.

TABLE IV: STATE OF CHARGE FOR BATTERY (SOC_BAT) IS NEGATIVE SMALL

| PHESS \ SOC_UC | PB | | PS | | ZERO | | NS | | NB | |
|---|---|---|---|---|---|---|---|---|---|---|
| | Ibatt | dp | Ibatt | dp | Ibatt | dp | Ibatt | dp | Ibatt | dp |
| PB | ZERO | ZERO | ZERO | ZERO | NB | NS | NB | NM | NB | NB |
| PS | ZERO | ZERO | ZERO | ZERO | NS | ZERO | NS | NS | NS | NM |
| ZERO | ZERO | ZERO | ZERO | ZERO | ZERO | ZERO | ZERO | ZERO | ZERO | ZERO |
| NS | PS | PM | PS | PS | PS | ZERO | ZERO | PS | PS | PS |
| NB | PB | PB | PB | PM | PB | PS | ZERO | PB | PS | PB |

FIG 8.

TABLE V: STATE OF CHARGE FOR BATTERY (SOC_BAT) IS NEGATIVE BIG

| PHESS \ SOC_UC | PB | | PS | | ZERO | | NS | | NB | |
|---|---|---|---|---|---|---|---|---|---|---|
| | Ibatt | dp | Ibatt | dp | Ibatt | dp | Ibatt | dp | Ibatt | dp |
| PB | ZERO | ZERO | ZERO | ZERO | NS | ZERO | NB | NM | NB | NB |
| PS | ZERO | ZERO | ZERO | ZERO | ZERO | ZERO | NS | NS | NS | NM |
| ZERO | ZERO | ZERO | ZERO | ZERO | ZERO | ZERO | ZERO | ZERO | ZERO | ZERO |
| NS | ZERO | PB | ZERO | PM | ZERO | PS | ZERO | ZERO | ZERO | ZERO |
| NB | ZERO | ZERO | ZERO | ZERO | ZERO | ZERO | ZERO | PB | ZERO | PB |

FIG 9.

POWER COORDINATION SYSTEM FOR HYBRID ENERGY STORAGE SYSTEM

RELATED APPLICATION INFORMATION

This application claims priority to provisional application Ser. No. 61/909,361 filed on Nov. 26, 2013, incorporated herein by reference, and provisional application Ser. No. 61/975,335 filed on Apr. 4, 2014, incorporated herein by reference. This application is also related to "FUZZY LOGIC BASED INTEGRATED POWER COORDINATION SYSTEM FOR HYBRID ENERGY STORAGE SYSTEM" Ser. No. 14/555,022 filed concurrently herewith.

BACKGROUND

Technical Field

The present invention relates to energy storage systems, and more particularly to hybrid ultra capacitor-battery storage systems and power management systems.

Description of the Related Art

The energy storage system has been recognized as an effective solution for counteracting the challenges when more and more renewable energy resources are integrated into power grid. Different energy storage technologies have different characteristics, e.g. energy/power density, cycle life, costs, efficiency, etc. For different applications, different aspects of storage system are required. For example, for the compensation of the intermittency of the renewable energy resources, energy storage with high energy density is mainly required. For the system experiencing high power transients, energy storage with high power density and fast dynamics is required. For some micro-grid applications, they have a high requirement on the energy storage system from all the aspects of time-scale, energy-scale and power scale. If a single-type energy storage system is chosen, it will be oversized in some aspects to take care of its weak points, e.g., the battery has to be oversized to respond to high power demand, while the ultra-capacitor has to be oversized to supply a sustainable power support. The application of hybrid energy storage systems can be unavoidable, where various types of storage elements are operated in a complement way to overcome their disadvantages. What is needed is a power management system that can provide for optimal utilization of the energy storage components.

SUMMARY

The present disclosure is directed to a method of managing power between the multiple components of a hybrid electrical energy storage system. In some embodiments, a hybrid energy storage system is provides that includes at least one battery storage element, at least one capacitor storage element, and a power management system for controlling power using a hardware processor through the battery storage element and the capacitor storage element. The power management system may include a long term battery management layer for estimating and managing a life cycle for the battery. The power management system may also include a real time power management layer for managing power sharing between the at least one battery storage element and the at least one capacitor storage element at each time instant dependent upon adjustments to battery performance based upon the long term battery management layer.

In another aspect, the present disclosure provides a method of controlling power in a hybrid energy storage system that may include controlling power through the at least one battery storage element and the capacitor storage element using a multi-level power management system. In some embodiments, the multi-level power management system includes at least a long term battery management layer and a real time power management layer. The long term battery management layer can be for estimating a life cycle for the battery. The real time power management layer can be for managing power sharing between the at least one battery storage element and the at least one capacitor storage element at each time instant dependent upon adjustments to battery performance based upon the long term battery management layer.

In yet another aspect, the present disclosure provides a computer program product comprising a non-transistory computer readable storage medium having computer readable program code embodied therein for performing a method for managing power between at least one battery storage element and at least one capacitor storage element. The method of the computer program product may include controlling power through the at least one battery storage element and the capacitor storage element using a multi-level power management system. The multi-level power management system can include at least a long term battery management layer for estimating a life cycle for the battery. The multi-level power management system may also include a real time power management layer for managing power sharing between the at least one battery storage element and the at least one capacitor storage element at each time instant dependent upon adjustments to battery performance based upon the long term battery management layer.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIGS. 5-9 depict tables illustrating some embodiments of a fuzzy logic rule base, in accordance with some embodiments of the present disclosure.

DETAILED DESCRIPTION OF PREFERRED EMBODIMENTS

Figure 1:
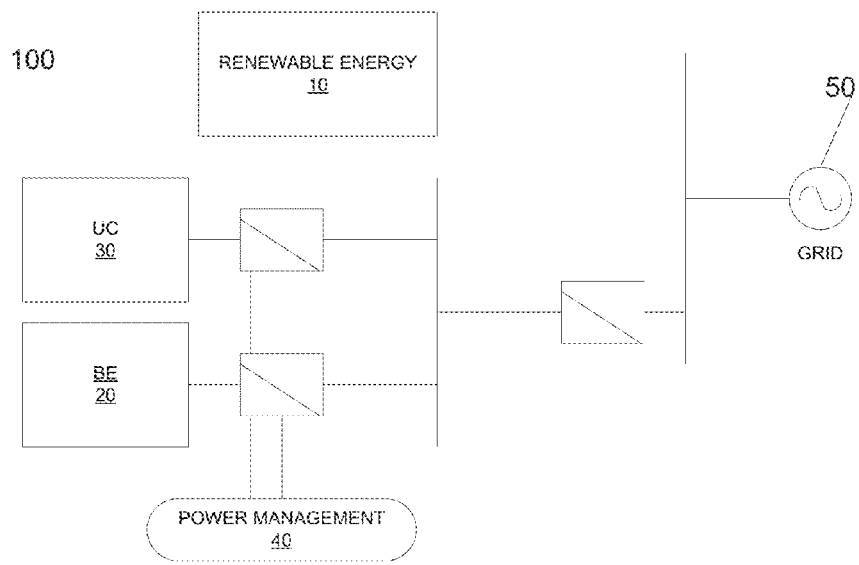
FIG. 1 is a schematic view depicting one embodiment of a system for hybrid energy storage system (HESS) integration with renewable energy resources, in accordance with the present disclosure.

The present principles are directed to an integrated fuzzy based power control strategy with a multi-rate operation mechanism. This approach coordinates the power sharing around various storage elements without the aid of filter-based scheme, which increases the control flexibility and robustness of the system. The methods, systems and computer products disclosed herein provide a better utilization of energy storage devices with a safe and sustainable system operation. In some embodiments, the methods, systems and computer products that are disclosed herein, combine a hybrid ultracapacitor battery storage system and a power management system for renewable energy integration applications, especially for helping smooth a photovoltaic (PV) fluctuating power output and optimizing the storage component performance. In some embodiments, the methods and systems disclosed herein, provide a design of a power coordination system (PCS) that deals with the power and energy sharing amongst energy storage devices, e.g., battery and ultracapacitors, instead of detailed control loops in those power electronic device, e.g., converters, inverters and similar type devices. A fuzzy logic based integrated PCS (power coordination system) is proposed to optimize the power/energy distributions among energy storage elements. As will be described further, in some embodiments, the power coordination system (PCS) may be composed of three layers. The first layer takes care of signal conditioning of storage device status. The second fuzzy-logic-based control layer implements the power coordination among the hybrid storage system by monitoring the operation status of all the energy storage devices and accounting for dynamic characteristics. The third and final layer alters the controller operation rate to commensurate with the dynamic characteristics of these storage devices.

As will be further described below, the fuzzy logic based integrated PCS (power coordination system) that is disclosed herein does not require a precise mathematical modeling or sophisticated computations, and mainly relies upon on-line system measurements. In some embodiments, the fuzzy logic based integrated PCS (power coordination system) is easy for being updated with different types of energy storage devices, and different component configurations (e.g. different unit size, different operation constraints, etc.). Typically, the fuzzy logic based integrated PCS provides better utilization of storage devices than previous systems. In some embodiments, the fuzzy logic based integrated PCS (power coordination system) may employ more practical signals as the control target, which can be directly related with the dynamic characteristics and system operation performances. Any target power profile may be employed with the fuzzy logic based integrated PCS (power coordination system). In some embodiments, only one integrated power controller is applied, which is capable of optimizing the control signals from the entire system. Further details regarding the methods, systems and computer products are now described with more detail with reference to FIGS. 1-15.

FIG. 1 depicts one embodiment of the system 100 configuration of renewable energy resources 10 with hybrid energy storage systems (HESS) connected through power electronic interfaces. This system configuration allows full control capability of the power storage elements, e.g., the battery 20 and the ultracapacitor (UC) 30. The charging/discharging of energy storage devices are driven through control over power electronics interfaces, independently.

The ultracapacitor 30, in simplified terms, is the series combination of two double layer capacitances, back-to-back in the same package to form a capacitor. In some examples, each electrode of the ultracapacitor consists of a double layer capacitance the capacity of which is dependent on cell potential, a nonlinear element. A packaged cell can consist of two carbon electrodes with a paper separator between, in which the assembly is immersed in a conductive electrolyte. Electrical connections are made to each electrode terminal (i.e., the metal current collector foils), the remaining contact being electrolyte liquid. In the back-to-back arrangement the liquid-liquid conduction path completes the ionic pathway.

The battery 20 may be a device consisting of one or more electrochemical cells that convert stored chemical energy into electrical energy. Each cell may contain a positive terminal, or cathode, and a negative terminal, or anode. In some embodiments, the battery 20 may be a lithium ion based battery. In other examples, the battery 20 may be one of a mercury battery, lead-acid battery, nickel-cadmium cell battery or other battery composition.

A power management system 40 is necessary to effectively combine the individual advantages of each single storage element, such as the battery 20 and the ultracapacitor 30. In some embodiments, the design principle of the power management system 40 is to operate the storage elements, e.g., the battery 20 and the ultracapacitor 30, in the way that not only is the requested power demand is precisely provided and meanwhile the energy storage components are safely and sustainable operated within their operational limits. So the power sharing between battery and UC should consider their currently energy status, the system power demand, and their own characteristics, e.g., the physical energy/power capacity constraints, charging/discharging power constraints, dynamic responding capabilities, etc., in real-time.

The system 100 depicted in FIG. 1 may be in connection with a grid 50 that provides for electrical communication to other electrical devices.

Figure 2:
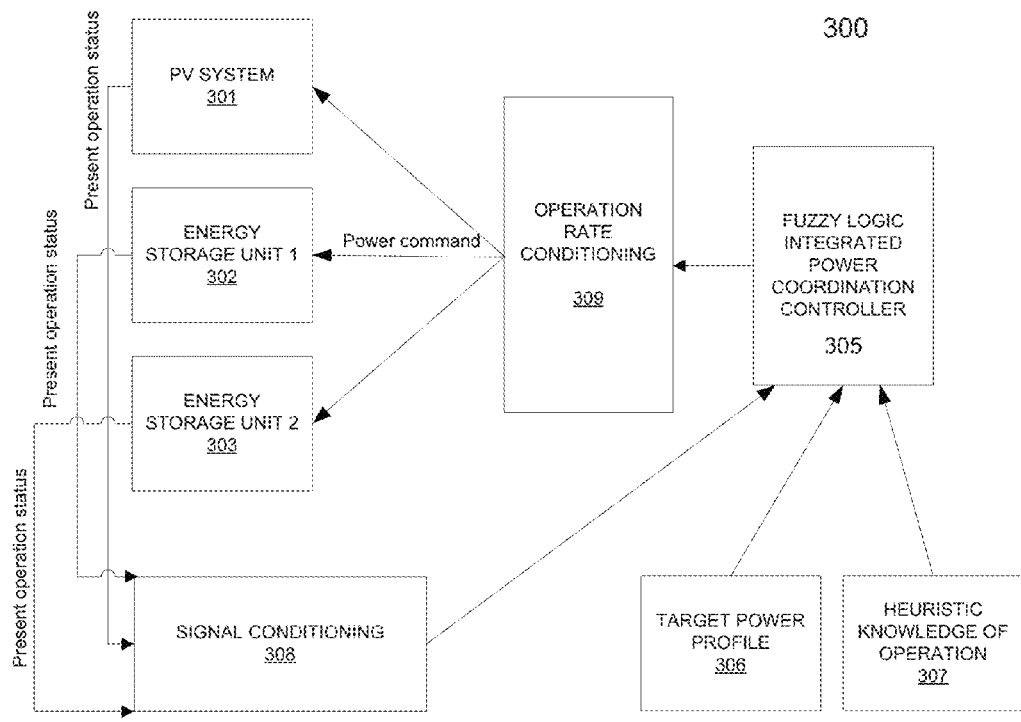
FIG. 2 is a schematic view depicting another embodiment of a system for hybrid energy storage system (HESS) integration with renewable energy resource provided by a photovoltaic structure, in accordance with the present disclosure.

FIG. 2 depicts another embodiment of a system 300 for hybrid energy storage system (HESS) integration with a renewable energy resource that is provided by a photovoltaic structure 301. A solar cell, or photovoltaic structure, is an electrical device that converts the energy of light directly into electricity by the photovoltaic effect. It is a form of photoelectric cell, defined as a device whose electrical characteristics, such as current, voltage, or resistance, vary when exposed to light. Solar cells are the building blocks of photovoltaic modules, otherwise known as solar panels.

Similar to the embodiment depicted in FIG. 1, the hybrid energy storage system (HESS) 300 that is depicted in FIG. 2 may include energy, i.e., power, storage components 302, 303. Each of the energy storage components 302, 303 may be a battery or an ultracapacitor. The system 300 also includes a power management system 305 similar to the power management system 40 that is described above with reference to FIG. 1. For example, the power management system 305 may be a fuzzy logic based integrated power coordination controller.

As depicted in FIG. 2, the fuzzy logic based integrated power coordination controller that provides the power management system 305 may incorporate a target power profile 306, e.g., smoothing power target, as well as heuristic knowledge of system operation 307, which may include component operation constraints, as well as other constraints, etc. The fuzzy logic based integrated power coordination controller that provides the power management system 305 may also consider data inputs regarding the present operation status of the photovoltaic system 301 and the energy storage units 302, 303. A module for signal conditioning 308 may condition the signals for the present operation status of the photovoltaic system 301 and the energy storage units 302, 303 prior to the data signals being received by the fuzzy logic based integrated power coordination controller that provides the power management system 305. In some embodiments, the controlling signal from the power management system 305 may pass through an operating rate module 309 which can adjust the operation rate for energy storage units, and also integrate current limiters into the power command signal that is to be received from the photovoltaic system 301 and the energy storage units 302, 303, which originates from the fuzzy logic based integrated power coordination controller that provides the power management system 305.

The design of power coordination system (PCS) deals with the power and energy sharing among energy storage devices, instead of the detailed control loops in those power electronics devices (e.g. converters, inverters). A fuzzy-logic-based integrated PCS is proposed to optimize the power/energy distributions among energy storage elements. The proposed PCS has three layers. The first layer takes care of signal conditioning of storage device status. The second fuzzy-logic-based control layer implements the power coordination among the hybrid storage system by monitoring the operation status of all the energy storage devices and accounting for their dynamic characteristics. The third and final layer alters the controller operation rate to commensurate with the dynamic characteristics of these storage devices. The layered system is further described below with reference to FIG. 4.

Figure 3:
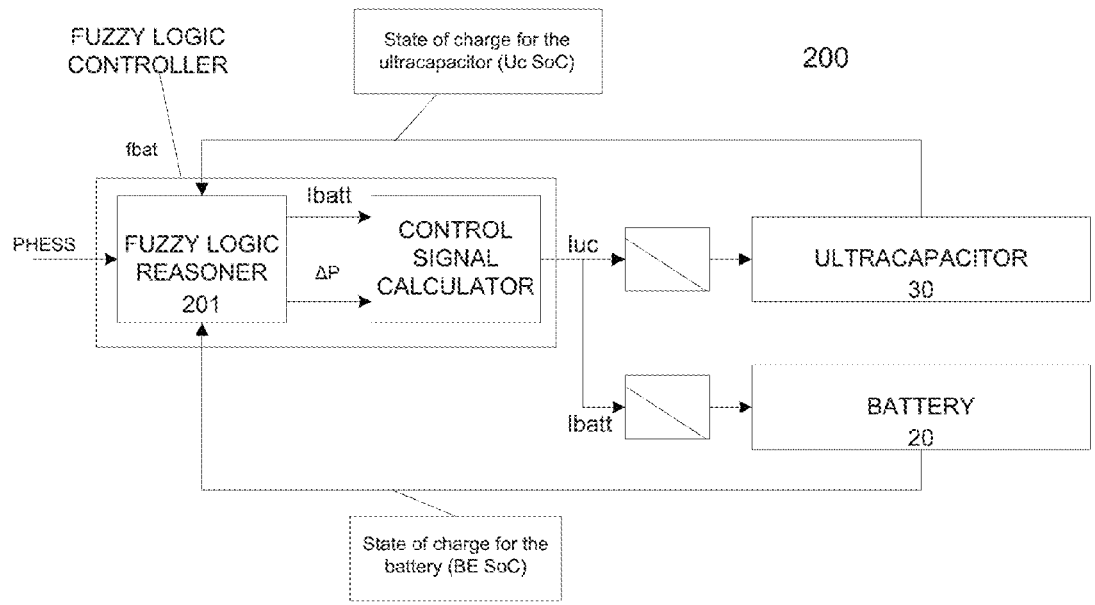
FIG. 3 depicts one embodiment of a control diagram of a power management system (PMS) for use with a hybrid energy storage system (HESS), in accordance with the present disclosure.

FIG. 3 depicts one embodiment of a control diagram of a power management system (PMS) 200 for use with a hybrid energy storage system (HESS). The requested HESS power ($P_{HESS}$) can come from the upper system application level, e.g., PV power fluctuation smoothing, load following, voltage regulation, etc. In some embodiments, for the fuzzy-logic reasoner 201 (also referred to as the fuzzy logic based integrated power coordination controller), the battery current ($I_{batt}$) is defined as the primary target control, since the battery charging/discharging power is more constrained than the ultracapacitor. Further, the way the battery is typically utilized in hybrid energy storage systems can greatly affect its life cycle. The power command for the ultracapacitor can then be determined by the subtraction of battery power from the requested total power from the hybrid energy storage system (HESS), as described in Equation (1), as follows:

$$I_{UC}(t) = \frac{(P_{HESS}(t) - (I_{bat}(t)) \cdot V_{bat} - \Delta P(t))}{V_{UC}(t)}, \quad \text{Equation (1)}$$

where t is time, $V_{UC}(t)$ is the measured UC terminal voltage at time instant t, $V_{bat}$ is the measured battery terminal voltage at time instant t, deviation from target power ($\Delta P$), and ($P_{HESS}$) is the requested HESS power. In some embodiments, current limiters may also be added as a feature of the power management system (PMS) 200, since both the battery and the ultracapacitor typically have to operate within their current limits. Meanwhile, considering the distinct dynamic response capability of a battery and ultracapacitor, a multi-rate operation mechanism can be further applied, as described by Y. Ye, P. Garg, R. Sharma, "Development and Demonstration of Power Management of Hybrid Energy Storage of PV Integration" *Innovative Smart Grid Technologies (ISGT Europe)*, 2014 4rd *IEEE PES, International Conference and Exhibition on*, 6-9 Oct. 2014. The power reference for the ultracapacitor and the battery are refreshed at different rates ($f_{bat}$, $f_{uc}$). The ultracapacitor operates quickly to follow the fast system dynamics, while the reduced operation rate accommodates the slow responding time of the battery.

Figure 4:
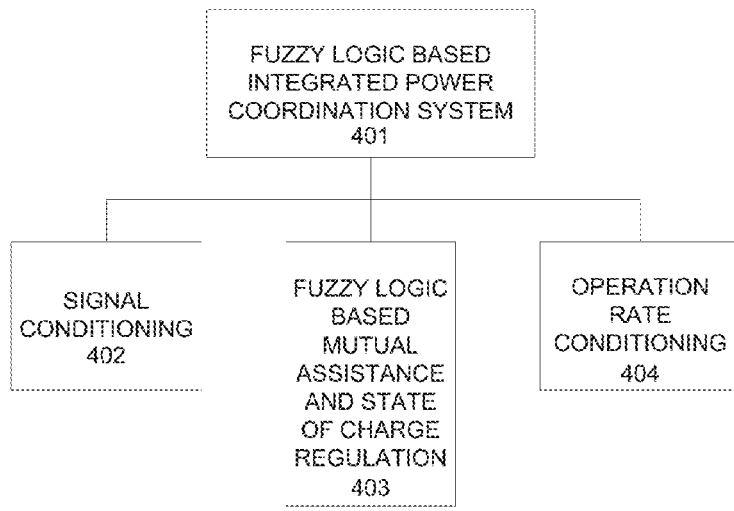
FIG. 4 shows one embodiment of a control diagram of a power management system (PMS) incorporating a fuzzy logic based integrated power coordination system for use with a hybrid energy storage system (HESS), in accordance with the present disclosure.

FIG. 4 shows one embodiment of a control diagram of a power management system (PMS) incorporating a fuzzy logic based integrated power coordination system (PCS) 401 for use with a hybrid energy storage system (HESS), as described with reference to FIGS. 1-3. For example, the description of the fuzzy logic based integrated power coordination system (PCS) 401 depicted in FIG. 4, may be used to further describe the power management system 40 that is depicted in FIG. 1, the fuzzy logic integrated coordination controller depicted in FIG. 2, and the fuzzy logic controller including the fuzzy logic reasoner 201 depicted in FIG. 3. In some embodiments, the fuzzy logic based integrated power coordination system (PCS) depicted in FIG. 4 operates in accordance with a series of rules, i.e., the rule base, as is described in further detail below with reference to FIGS. 5-9. Another element of the fuzzy logic based integrated power coordination system (PCS) is membership functions of control variables, as is described in further detail below with reference to FIGS. 9-14.

Referring to FIG. 4, in some embodiments, the fuzzy logic based integrated power coordination system 401 includes a signal conditioning module 402, a fuzzy logic based mutual assistance and state of charge regulation module 403, and an operation rate conditioning module 404. This provides a three-layer integrated power coordination system for the hybrid energy storage system (HESS). While primarily for photovoltaic (PV) output smoothing, the signal conditioning module 402 provides for conditioning of the input signals. The signal conditioning module 402 may be referred to as the first layer. The second layer of the fuzzy logic based integrated power coordination system 401, which can be provided by the fuzzy logic based mutual assistance and state of charge regulation module 403, can compute the power command for different energy storage elements, such as the battery and the ultracapacitor, using fuzzy logic based on present status inputs from different components of the system. For example, the status inputs can be the status of charge for the battery (BE SoC) and the status of charge for the ultracapacitor (UC SoC), as well as the requested power of demand ($P_{HESS}$) of the hybrid energy storage system (HESS), as depicted in FIG. 3. Referring to FIG. 4, the operation rate conditioning module 404 can provide the third layer, which can adapt the operation rates based on the energy storage element characteristics.

In one example, the signal conditioning provided by the signal conditioning module 402 can include an exponential smoothing technique that is used for the suppression of noise. Voltage and current measurements from any storage element, such as the ultracapacitors 30 and battery 20, can contain a lot of noise. The noise in the signal for the ultracapacitors 30 and battery 20, i.e., power storage elements, can be smoothed using by the signal conditioning module 402 with an exponential smoothing that can be expressed as follows:

$$y(t)=(\alpha)\cdot x(t)+(1-\alpha)\cdot y(t-1), \quad \text{Equation (2)}$$

wherein $x(t)$ is the input to the filter and $y(t-1)$ is the output at previous time step $(t-1)$. The advantage of using exponential smoothing instead of other filtering approaches like moving average, s-filter or even physical filter is the small time delay. All other filtering approaches introduce considerable time delay between the filtered signal and original signal. Exponential smoothing helps to minimize this time delay.

In some embodiments, the hybrid energy storage system (HESS) combines the advantage of different types of energy storage elements. The presence of energy storage elements with different characteristics, such as batteries 40 and ultracapacitors (UC) 30, provides an opportunity for mutual assistance, such as the fuzzy logic-based mutual assistance and state of charge (SOC) regulation module 403. For example, a lower energy density source, such as an ultracapacitor 30, can be quickly depleted or overcharged. Once the SOC of the ultra-capacitor goes out of boundary, it will be put in stand-by mode. In such cases, the presence of a high energy density source, e.g., battery 20, can be used to charge the depleted ultracapacitor 30 and bring it back into reliable operation range. Meanwhile, as the high power density energy component, the ultracapacitor 30 can help alleviate the high power pressure on battery 20. The fuzzy logic-based mutual assistance and SOC regulation module 403 provides the ability to manage the use of the battery 20 and the capacitor 30 in the most effective way. The fuzzy logic-based mutual assistance and SOC regulation module 403 functions in view of a set of fuzzy rules, as depicted in FIG. 5-9, and a membership of input/output variables, as depicted in FIGS. 10-14.

In some embodiments, the operation of energy storage elements within reliable SOC ranges prescribed by the manufacturer can prolong the life of the storage elements, such as extend the life of the battery or ultracapacitor. Through optimal utilization of energy storage elements, the system cost can be reduced without oversizing the energy storage elements.

The operation rate conditioning module 404 can alter the operation rate for the different energy storage elements, e.g., the battery and the ultracapacitor, based on their dynamic characteristics. For example, for the ultracapacitor, it can be operated on a high rate considering its fast responding time. While for the battery system, it can be operated at a lower rate, which will help reduce the number of micro-cycles during operation.

In some embodiments, the fuzzy based logic based power coordination system (PCS) of the present disclosure, also referred to as the power management system 40 in FIG. 1, the fuzzy logic integrated power controller 305 in FIG. 2, the fuzzy logic reasoner 201 in FIG. 3, and the fuzzy logic based integrated power coordination system 401 in FIG. 4, translates expert knowledge into a set of "if then" based fuzzy rules, as depicted in FIGS. 5-9. In some embodiments, fuzzy control is effect when the system model is complex, non-linear or unclear. In some embodiments, a fuzzy logic based power coordination system (PCS) is employed for use with the methods, structures and computer products disclosed herein, because:

(1) it allows for incorporating for non-linear characteristics of energy storage elements;

(2) it does not require precise modeling of the multiple converter system;

(3) it allows for storage component operation within defined regions of state of charge (SoC);

(4) it allows for battery storage elements to aid the ultracapacitors in cases of low/high state of charge (SoC) and keeps the ultracapacitor (UC) system in operation; and (5) it can allow for a comprehensive and intuitive control strategy.

In some embodiments, the fuzzy logic based PCS acts as a master/supervisory controller which takes in several input variables and provides battery current references as the control target. The power reference for ultracapacitor can be calculated based power balance requirements.

Typically, in prior hybrid energy storage systems, multiply fuzzy controllers have been used with each controller acting upon one energy storage elements, which had a few disadvantages. The state of charge (SOC) of the battery 20 and the ultracapacitor 30 are controlled independently based on their own operating status, e.g., state of charge (SoC). The mutual assistance between these two storage elements is not fully utilized, e.g., the battery is operated as an auxiliary energy support for the ultracapacitor when the state of charge (SoC) of the ultracapacitor is approaching the boundary. The other disadvantage lies in the fact that these controllers adjust the target power based on the state of charge (SOC) independent which modifies the power profile in an uncontrollable way. In other words, the above described prior methods of managing hybrid energy storage systems (HESS) compromise power smoothing performance.

In some embodiments of the power coordination system (PCS) that is provided by the present disclosure, all the information is taken into one fuzzy logic controller and control references are generated simultaneously. One advantage of the power coordination system (PCS) provided by the present disclosure is that the controller is more aware or perceptive. Thus, the principle of mutual assistance between different energy storage elements comes into play. This means that in moments of need, ultracapacitors can be aided by the battery based on the batteries state of charge (SOC). This helps to resurrect the ultracapacitor system in situations of low state of charge (SOC) where it can get cut-off. Another advantage is that the controller doesn't use a filter based approach. This allows the controller to bring the battery into the picture only when the ultracapacitor state of charge (SOC) becomes low. Therefore, the power coordination system (PCS) employed in the present methods, systems and computer products that are disclosed herein minimize batter operation times and potentially enhance the life cycle of the battery.

Referring to FIG. 3 and Equation 1, the battery (BE) state of charge (SoC), the ultracapacitor (UC) state of charge (SoC), and the requested power of demand of the hybrid energy storage system ($P_{HESS}$) are the inputs to the fuzzy controller, i.e., fuzzy logic reasoner 201. The battery reference current ($I_{bat}$) and deviations from the target power (ΔP) are the two outputs from the integrated fuzzy controller. The ultracapacitor reference current ($I_{UC}(t)$) is calculated from the power balance equation given by Equation 1. The requested HESS power ($P_{HESS}$) can be determined from an upper system application level, such as PV power fluctuation, load following voltage regulation and a combination thereof. The losses in the system can be ignored. In some embodiments, the battery reference current ($I_{bat}$) provides a current increase to the battery from the fuzzy logic reasoner 201, and the ultracapacitor current ($I_{UC}$) provides a current increase to the ultracapacitor from the fuzzy logic reasoner 201.

In some embodiments, the choice of the battery reference current ($I_{bat}$) is made to minimize the changes in battery current and aid the ultracapacitor (UC) energy when needed. The deviation from target power, ΔP, can be selected as the second output in order to manage the smoothing performances.

As described above, the rule base is the knowledge of the system that is translated to a set of rules to operate the hybrid energy storage system (HESS). These rules take into account system dynamics (battery (BE)/ultracapacitor (UC)), constraints (state of charge (SoC), charging/discharging power) and other practical aspects (mutual assistance). The following highlights the underlying motivation to the rule base in some embodiments of the present disclosure.

1. Maintain the battery (BE) in a range of state of charge (SoC) where it has capacity to absorb and deliver energy;
2. Maintain the ultracapacitor (UC) in a range of state of charge (SoC) where it can absorb and delivery power quickly;
3. Make sure the ultracapacitor (UC) responds to high power dynamics, and the battery provides a smooth power profile;
4. Aid the ultracapacitor (UC) in cases where the state of charge (SoC) of the ultra-capacitor (UC) approaches a lower region by additional discharging of the battery (BE); and
5. Aid the ultracapacitor (UC) in cases where the state of charge (SoC) or (UC) approaches higher region by additional charging of the battery (BE).

In some embodiments, the input/output of the fuzzy logic controller is determined by the number and shape of the membership functions of each fuzzy variable, as illustrated by FIGS. 10-14, as well as the selection of fuzzy rules, as illustrated by Tables 1-5 in FIGS. 5-9. The fuzzy logic reasoner 201 takes a signal for the state of charge for the ultracapacitor ($SoC_{UC}$), the state of charge for the battery ($SoC_{BE}$), and the requested HESS power ($P_{HESS}$) as the input variables, as depicted in FIG. 3. During the system operations, the state of charge for the ultra-capacitor ($SoC_{UC}$) can display a high degree of variation, and can easily approach saturation or depletion when it is frequently active in responding to fast dynamic power requirement. While considering the good energy capacity of the battery, the battery is designed to play the role of helping regulate the state of charge for the ultracapacitor ($SoC_{UC}$) in a smooth way. In some embodiments, the rules that are illustrated in Tables 1-5 in FIGS. 5-9 are designed so that firstly the battery provides a low and smooth power supply; and secondly so the battery can act as a complementary energy resource to help regulate the state of charge for the ultra-capacitor ($SoC_{UC}$) when it is approaching the boundary conditions. The rules determine how much the battery power is activated based on the regions where the state of charge for the ultra-capacitor ($SoC_{UC}$), the state of charge for the batter ($SoC_{BE}$) and the HESS power demand are located.

The input and output membership is shown in FIGS. 10-14. The fuzzy variables on input and output are expressed by linguistic variables: "positive big (PB)", "positive medium (PM)", "positive small (PS)", "Zero (ZO)", "negative big (NB)", "negative medium (NM)", and "negative small (NS)". The negative value (−) is for charging, and the positive value (+) is for discharging.

Figure 10:
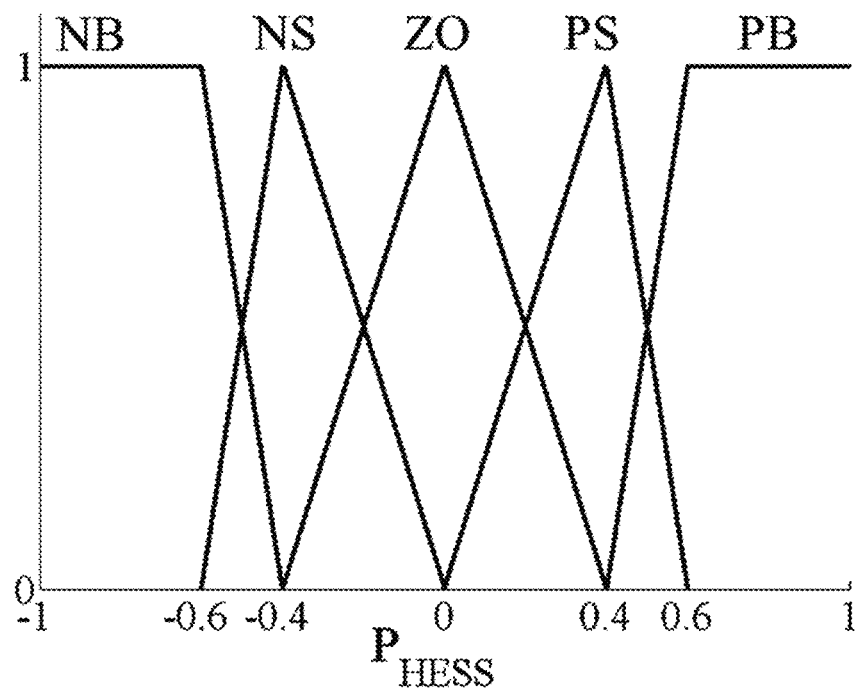
FIGS. 10-14 are plots depicting some membership functions for use with some embodiments of the present disclosure.
Figure 11:
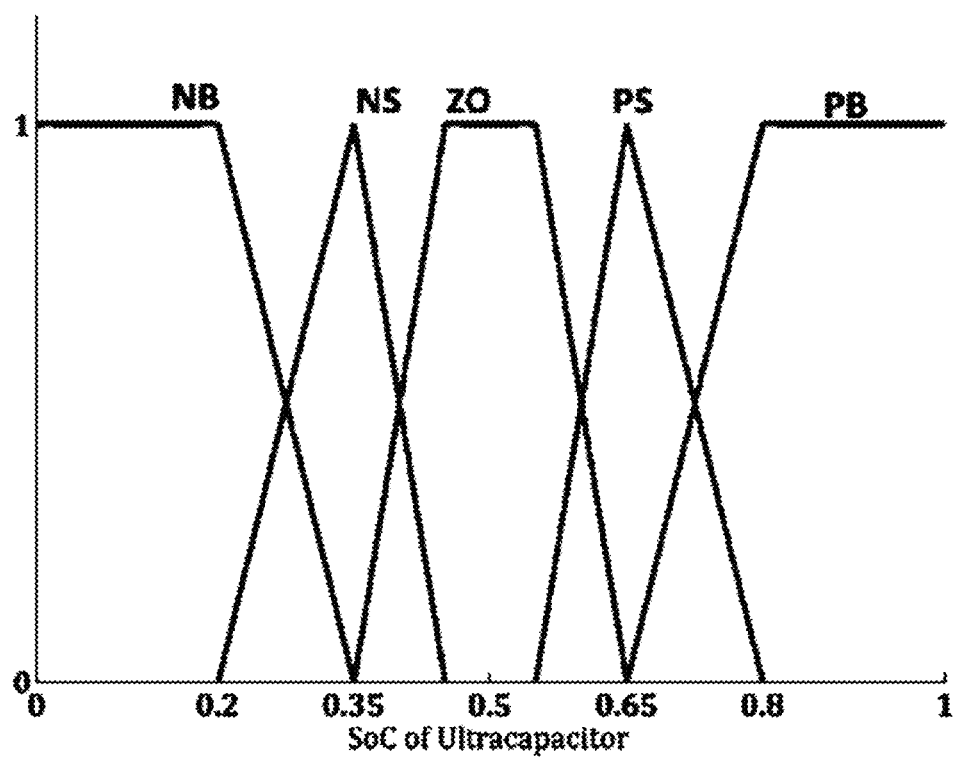
Figure 12:
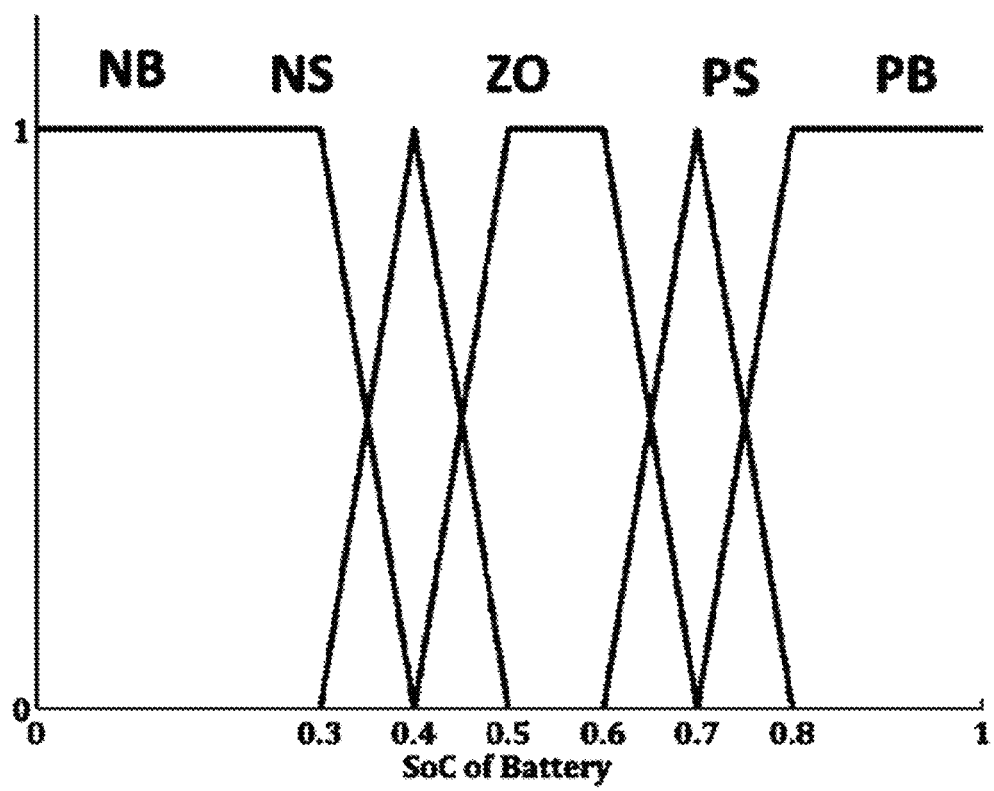

FIG. 10 is one embodiment of the membership function for the requested HESS power ($P_{HESS}$). FIG. 11 is one embodiment of the membership function for the state of charge for the ultracapacitor (SoC_UC). FIG. 12 is one embodiment of the membership function for the state of charge for the battery (SoC_BE). In some embodiments, the membership functions depicted in FIG. 10-12 are the input membership functions. Numerical values, i.e., quantitative values, are converted to qualitative values, such as "positive big (PB)", "positive medium (PM)", "positive small (PS)", "Zero (ZO)", "negative big (NB)", "negative medium (NM)", and "negative small (NS)", using the plots depicted in FIGS. 10-12, i.e., membership functions. The converted qualitative values provided by the input membership function are then used as inputs into the rule base for the fuzzy logic based integrated power coordination system (PCS) 401 depicted in FIG. 4, the power management system 40 depicted in FIG. 1, the fuzzy logic integrated coordination controller depicted in FIG. 2, and the fuzzy logic controller including the fuzzy logic reasoner 201 depicted in FIG. 3.

FIGS. 5-9 include a set of exemplary rules, i.e., rule base. In the example, that is depicted in FIGS. 5-9, in order to coordinate power splitting between the two energy storage units, i.e., the battery and the ultracapacitor, 125 rules have been defined. Table I as depicted in FIG. 5. is a rule base for when the state of charge for the battery (SoC_BAT) (also referred to as SoC_BE) is positive big. Table II as depicted in FIG. 6 is a rule base for when the state of charge for the battery (SoC_BAT) is positive small. Table III as depicted in FIG. 7 is a rule base for when the state of charge for the battery (SoC_BAT) is zero. Table IV as depicted in FIG. 8 is a rule base for when the state of charge for the battery (SoC_BAT) is negative small. Table V as depicted in FIG. 9 is a rule base for when the state of charge for the battery (SoC_BAT) is negative big.

In some embodiments, using the quantitative values, i.e., "positive big (PB)", "positive medium (PM)", "positive small (PS)", "Zero (ZO)", "negative big (NB)", "negative medium (NM)" determined from the membership functions, e.g., FIGS. 10-12, for the inputs, e.g., the state of charge for the ultracapacitor ($SoC_{UC}$), the state of charge for the batter ($SoC_{BAT}$) and the HESS power demand ($P_{HESS}$), the table is selected for the rule base, e.g., Table I-V in FIGS. 5-9, and the outputs for the fuzzy logic controller including the fuzzy logic reasoner 201 depicted in FIG. 3 (which is also referred to as being the fuzzy logic based integrated power coordination system (PCS) 401 depicted in FIG. 4, the power management system 40 depicted in FIG. 1, and the fuzzy logic integrated coordination controller depicted in FIG. 2).

Referring to Tables I-V in FIGS. 5-9, the outputs may be battery reference current (Ibatt) and the deviation from target power (dp). The battery reference current (Ibatt) that is depicted in Tables I-V is equal to variable $I_{bat}$ in equation 1. The deviation from target power (dp) is the difference in the power present in the hybrid energy storage system and the target for the power in the hybrid energy storage system, which may be based on the requirements of the grid. The deviation from target power (dp) that is depicted in Tables I-V is equal to variable ($\Delta P$) in equation 1.

Figure 13:
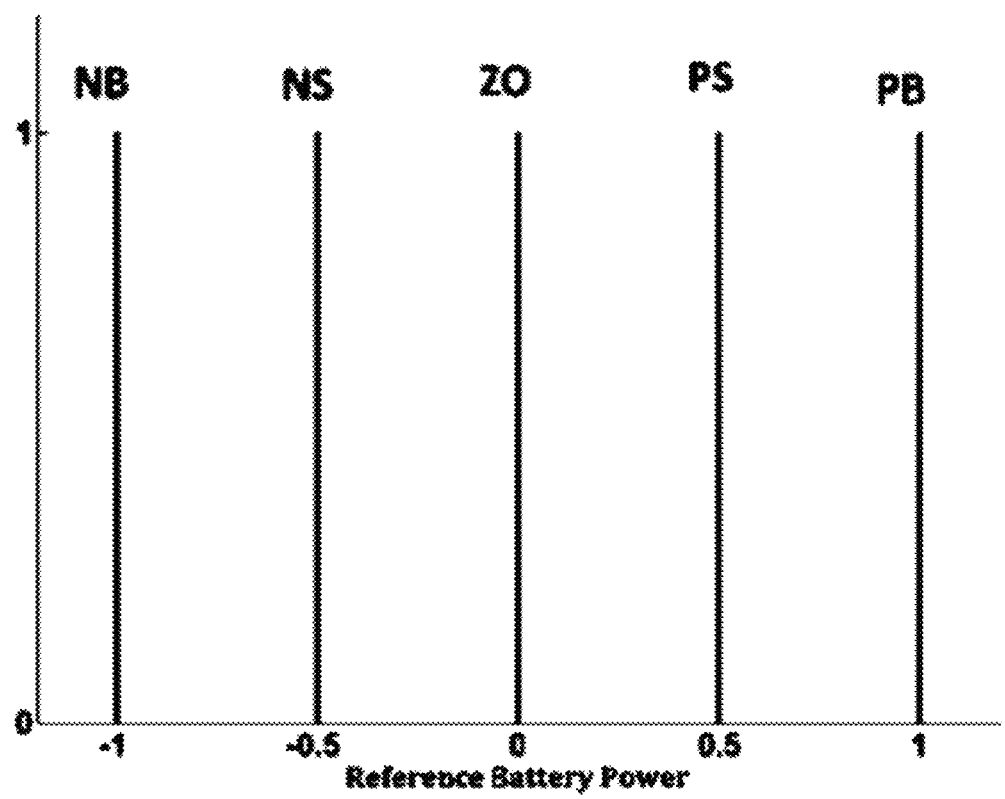
Figure 14:
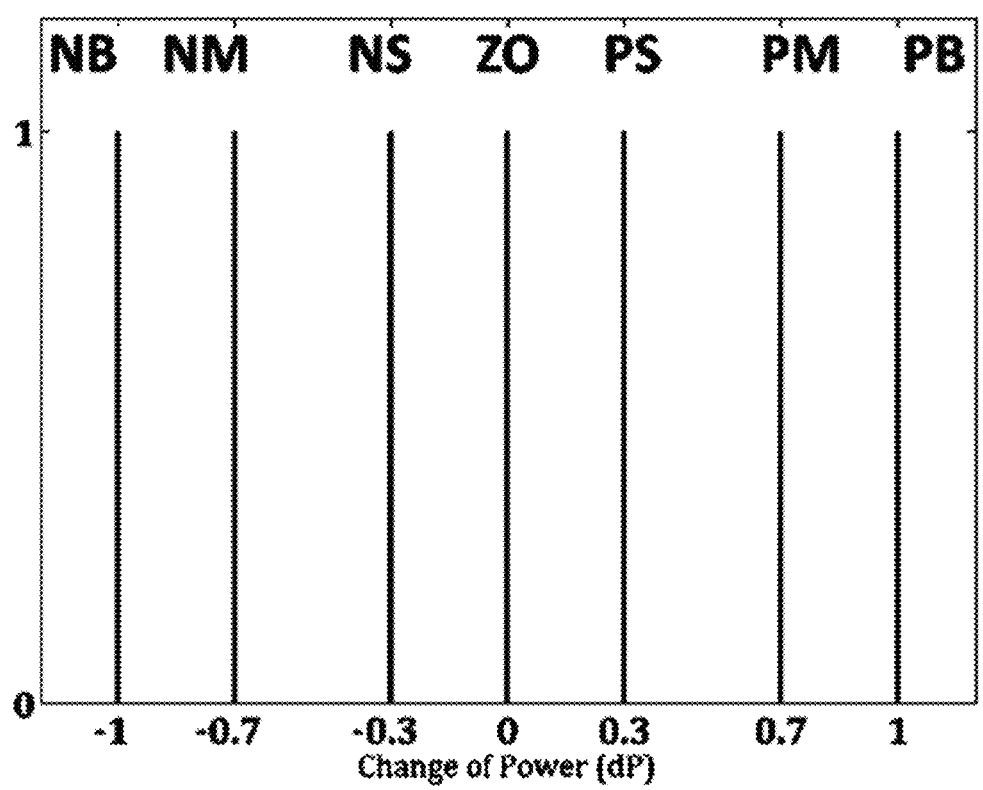

The values for battery reference current (Ibatt) and the deviation from target power (dp) that are included in the rule base depicted in FIGS. 5-9 are qualitative values, e.g., "positive big (PB)", "positive medium (PM)", "positive small (PS)", "Zero (ZO)", "negative big (NB)", "negative medium (NM)". Then the output of the battery reference current (Ibatt) and the deviation from target power (dp) are defuzzified through centroid defuzzification and converted to a quantitative value, e.g., numerical value corresponding to a measurement of current or power, using membership functions, as depicted in FIG. 13 and FIG. 14. FIG. 13 is one embodiment of a membership function for the battery reference current (Ibatt), and FIG. 14 is one embodiment of a membership function for the deviation from target power (dp).

In some embodiments, the functionality corresponding the rule base and membership functions are provided by a purpose built hardware processor and memory system that can receive inputs and transmit outputs as the fuzzy logic controller including the fuzzy logic reasoner 201 depicted in FIG. 3 (which is also referred to as being the fuzzy logic based integrated power coordination system (PCS) 401 depicted in FIG. 4, the power management system 40 depicted in FIG. 1, and the fuzzy logic integrated coordination controller depicted in FIG. 2).

As described above, the battery reference current (Ibatt) may be the output of the fuzzy logic reasoner 201 which may be further processed by the control signal calculator to decide if the current to the battery 20 is to be increased or decreased or remains unchanged. In some embodiments, the battery reference current (Ibatt) and the deviation from target power (dp) may be used as variables in equation 1 to provide the reference current (Iuc) for the ultra-capacitor.

Figure 15:
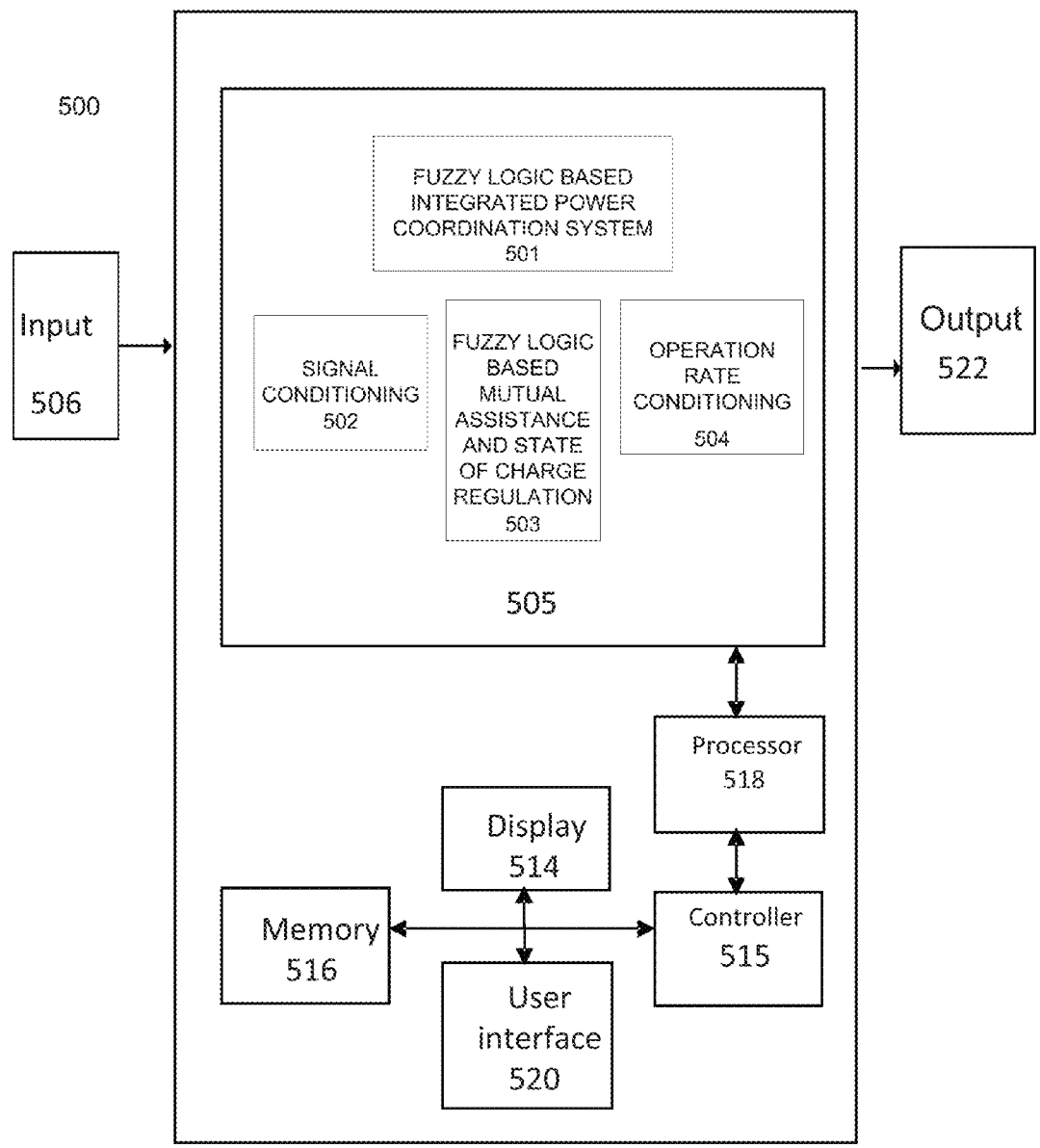
FIG. 15 is a schematic view of an exemplary control system to manage power between the multiple components of a hybrid electrical energy storage system (HESS), in accordance with the present disclosure.

FIG. 15 depicts one embodiment of a system to perform management of power in a hybrid energy storage system. The hybrid energy storage system may include an energy source, such as a renewable energy source, e.g., photovoltaic system, and at least a first and second power storage element, such as a battery and an ultracapacitor, as well as a power management system. These structures have been described above. To reiterate, the power management system is for controlling energy/power distribution among the at least the first and second power storage elements. In one embodiment, the system 500 preferably includes one or more processors 518 and memory 516 for storing applications, modules and other data. In one example, the one or more processors 518 and memory 516 may be components of a computer, in which the memory may be random access memory (RAM), a program memory (preferably a writable read-only memory (ROM) such as a flash ROM) or a combination thereof. The computer may also include an input/output (I/O) controller coupled by a CPU bus. The computer may optionally include a hard drive controller, which is coupled to a hard disk and CPU bus. Hard disk may be used for storing application programs, such as some embodiments of the present disclosure, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link.

The system 500 may include one or more displays 514 for viewing. The displays 514 may permit a user to interact with the system 500 and its components and functions. This may be further facilitated by a user interface 520, which may include a mouse, joystick, or any other peripheral or control to permit user interaction with the system 500 and/or its devices, and may be further facilitated by a controller 515. It should be understood that the components and functions of the system 500 may be integrated into one or more systems or workstations. The display 514, a keyboard and a pointing device (mouse) may also be connected to I/O bus of the computer. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

The system 500 may receive input data 506 which may be employed as input to a plurality of modules 505 that provide the fuzzy logic based integrated power coordination system module 501, which may include at least a conditioning signal module 506, fuzzy logic based mutual assistance and state of charge regulation module 503, and an operation rate conditioning module 504. The system 500 may produce output data 522, which in one embodiment may be displayed on one or more display devices 514. It should be noted that while the above configuration is illustratively depicted, it is contemplated that other sorts of configurations may also be employed according to the present principles.

The signal conditioning module 502 is configured for suppressing noise in signals from at least the first and second power storage elements, e.g., the voltage, current measurement signals of battery and ultracapacitors. The fuzzy logic mutual assistance module 503 may be configured for determining with a hardware processor a distribution of current to be distributed to each of the at least one first power storage element, e.g., battery, and the second power storage element, e.g., ultracapacitor, from a fuzzy rule base and membership function, as described above with reference to FIGS. 5-14. The rate conditioning module 504 may be configured for controlling the operation rate of at least one of the first power storage element, e.g., battery, and the second power storage element, e.g., ultracapacitor. Further details regarding the modules 502, 503, 504 that provide the fuzzy logic based integrated power system module 501 have been described above with reference to FIGS. 1-14.

In another embodiment, the present disclosure deals with management of multiple storage element, e.g., ultracapacitor and battery, hybrid energy storage systems, as well as provides a real time power management system that optimizes system operation performance, including storage life extension and system efficiencies improvements, etc.

A multi-layer multi-objective control framework for hybrid energy storage systems (HESS) has been proposed. Similar to the previous embodiments, in this embodiment the HESS may be composed of a single battery or multiple batteries and a single ultracapacitor or ultracapacitor banks. The control framework addresses different objectives in different layers at different time scales. Further, in some embodiments, the control structure is designed in a scalable way which is capable of accommodating multiple storage elements.

In some embodiments, for the upper battery management layer, the battery energy status and battery cycle life is estimated and managed in a quantified way. For example, for the instant power management layer, it controls power flow among the storage elements to achieve the optimized system efficiency. At the same time, the state of charge for the ultracapacitor (UC SoC) is managed to operate within a predefined range. These two management layers are operated on different time scales, which not only meet the system operation characteristics, but also reduce the computation complexity.

Compared to prior optimization approaches, in some embodiments, the proposed control framework manages different control objectives on different layers with different time-scales, which reduces computational complexity and enables faster real-time operation. In some embodiments, the proposed control framework of HESS is designed in a general way, so that there is no need for known or predictable system power profile, or upper-layer HESS application scenarios. In some embodiments, the generalized control framework of HESS is designed to achieve the objectives of storage life management, system efficiency improvement, and the sustainable and safe operation of HESS. Further, the battery cycle is monitored and managed in a quantified way.

Figure 16:
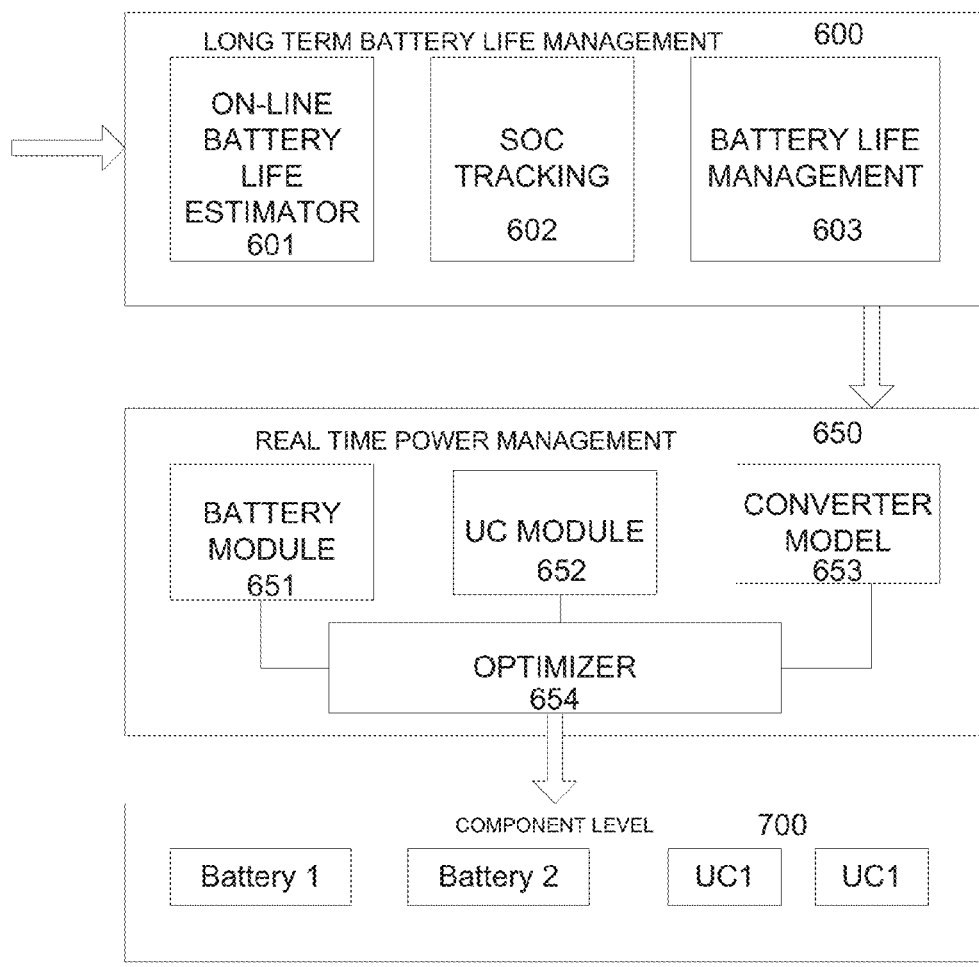
FIG. 16 is a block diagram depicting the different levels of management in a power management system of a hybrid energy storage system in accordance with the present disclosure.

FIG. 16 depicts one embodiment of a block diagram depicting the different levels of management in a power management system of a hybrid energy storage system in accordance with the present disclosure. At one level is a long-term battery life management level 600. This level may consisting of an on-line battery life estimator 601, a state of charge (SoC) tracking module 602, and a battery life management module 603. A second level is the real time power management level 650. This level may consist of a battery model module 651, an ultra-capacitor model module 652, and a converter model module 653, which provide inputs to an optimizer 654. A third level is provided by the component level control 700. This level may include the battery and ultracapacitors, and connecting converters.

Figure 17:
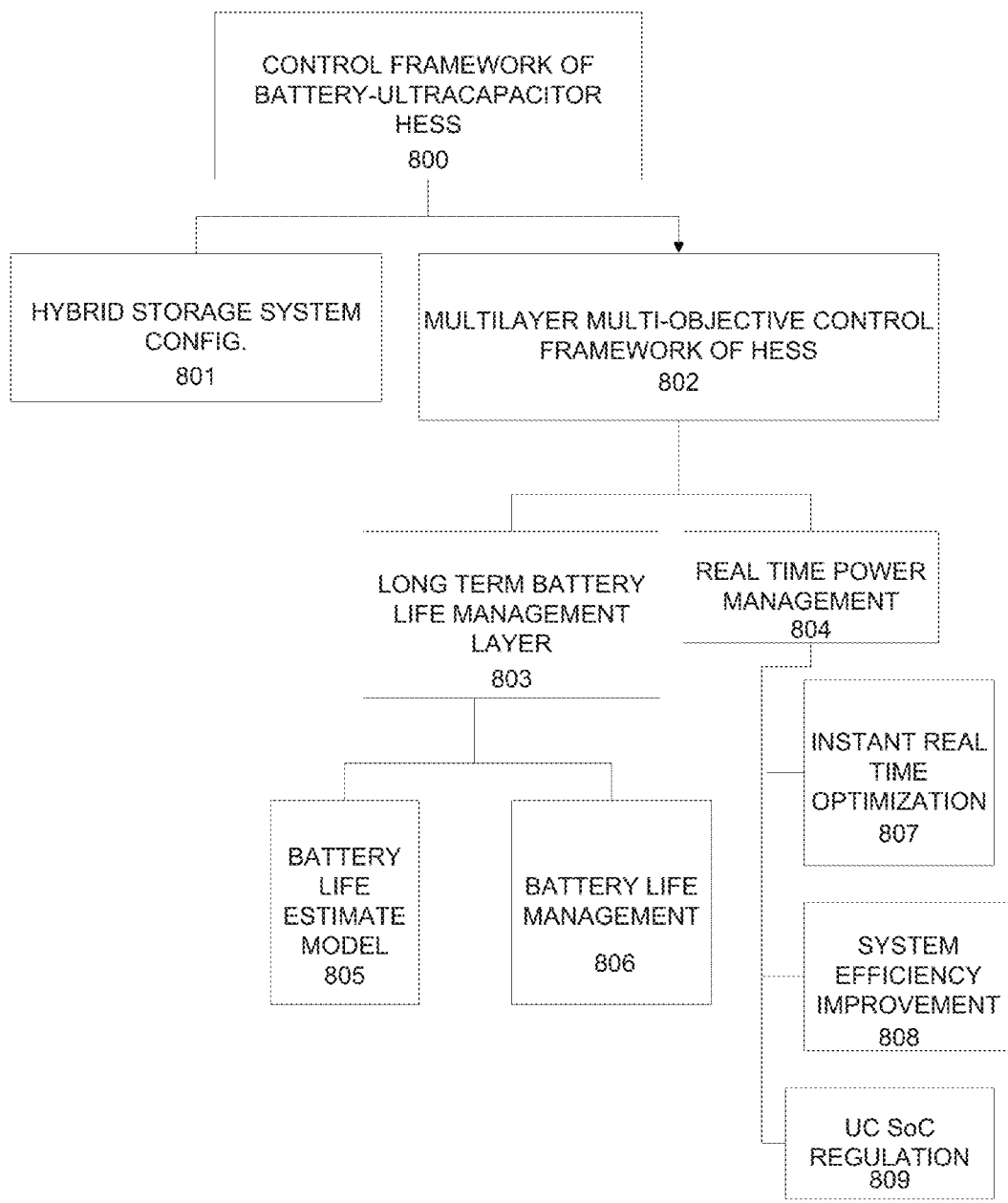
FIG. 17 depicts a block diagram for a hybrid storage system configuration, in accordance with some embodiment of the present disclosure.
Figure 18:
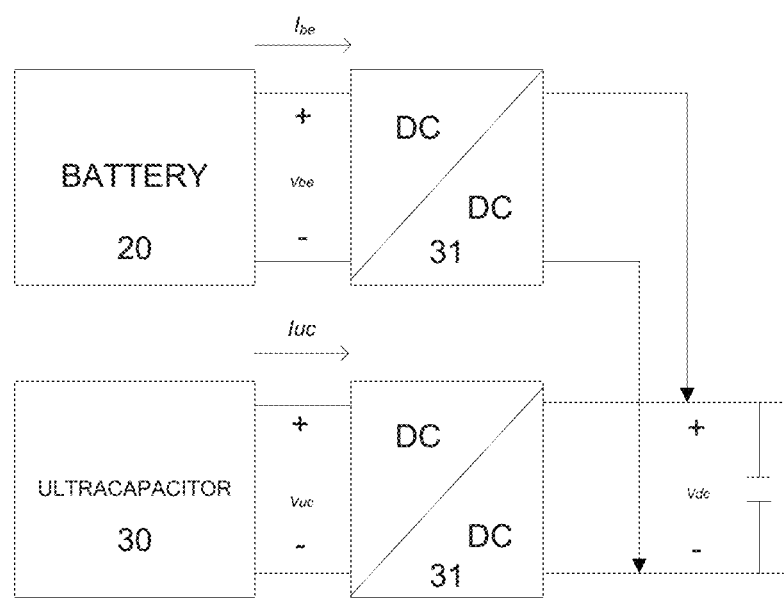
FIG. 18 depicts a circuit diagram of components of the hybrid energy storage system, in accordance with one embodiment of the present disclosure.

FIG. 17 depicts a block diagram for a hybrid storage system configuration 800 in accordance with some embodiment of the present disclosure. At block 801, the system, i.e., circuit, diagram of the hybrid storage system configuration is provided, as depicted in FIG. 18. In one embodiment, the hybrid energy storage system (HESS) includes a battery 20 and an ultracapacitor 30, each one equipped with a DC/DC converter 31, connected to a DC link. The power flow of the hybrid energy storage system (HESS) is driven by the direct control of these power electronic interfaces.

Referring to block 802 of FIG. 17, the multilayer multi-objective control framework of the HESS may include a long-term battery management layer 803 and a real time power management level 804. The long term battery management layer 803 depicted in FIG. 17 is equivalent to the long term battery life management 600 depicted in FIG. 16; and the real time power management level 804 depicted in FIG. 17 is equivalent to the real time power management 650 depicted in FIG. 16. In some embodiments, considering the nearly unlimited cycle life of ultracapacitor in comparison to the batteries, the lifetime of the hybrid energy storage system (HESS) is greatly dependent on the battery elements. The long term battery management layer 803 is designed to monitor and manage the battery cycle life. There are various battery life estimation models suitable for this purpose. An on-line cumulative battery life estimation model based on the workload is typically necessary.

The long term battery management layer 803 typically includes a battery life estimation model 805 and a battery management module 806. In the battery life estimation model 805, for different grid applications, the batteries may experience irregular partial charging/discharging cycles. In conventional battery life estimation methods, it is assumed that life estimation is carried out at the end of each operation cycle when the depth of discharge (DoDs) and battery discharge currents for all previous discharge events are known. Here a framework for online battery life estimation under partial life cycles are applied, which is referred to U.S. Patent Application Publication No. 2014/013191 titled "*Method for Estimating Battery Life in Presence of Partial Charge and Discharge Cycles*" to Asghari et al., which is incorporated in its entirety by reference. In this battery life estimation model, the life estimation is related to depth of discharge (DoD) and rate of discharge and updated cumulatively on-line.

Figure 19:
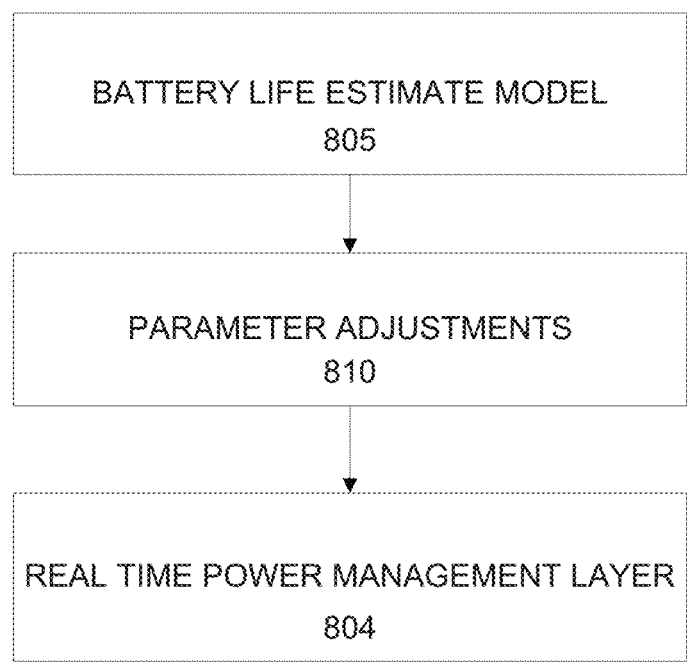
FIG. 19 depicts a flow chart depicting one embodiment of the relationship between the power management policy in the real-time power management layer and the long term battery life management layer, in accordance with the present disclosure.

For the battery life management module 806, the change of workload of battery can directly affect the battery life. The relationship between the power management policy in the real-time power management layer 804 and the long term battery life management layer 803 is depicted in FIG. 19. In some embodiments, the battery workload is directly determined by the real-time power management layer 804, which manages the power sharing among storage elements at each time instant. Based on the monitored battery life for each battery bank ($T_i$) and its life expectancy ($T_{exp,i}$), the power management policy in the real-time power management layer 804 will be affected through the long term battery life management layer 803. In some embodiments, there are various factors that will affect the battery life, where the factors to be considered here include maximum depth of discharge ($DoD_{max}$) and maximum discharging current ($I_{disbat,max}$). These two factors are taken as constraints of the optimization problems in the real time power management layer 804.

In some embodiments, when there exists multiple battery banks in the hybrid energy storage system (HESS), the cycle life (Ti) of each battery bank can be estimated and managed individually. The parameter set ($DoD_{max}$, $I_{disbat, max}$) can be adjusted, as depicted as parameter adjustments 810 in FIG. 19, stepwise as follows until they reach the limitations, i.e., parameter adjustment rules:

If $T_i < T_{exp,i}$, then $DOD_{max}(t+\Delta T) = DOD_{max}(t) - D_{step}$;
$$I_{dispat,max}(t+\Delta T) = I_{dispat,max} - I_{step} \quad \text{Equation (3)}$$

If $T_i > T_{exp,i}$, then $DOD_{max}(t+\Delta T) = DOD_{max}(t) + D_{step}$;
$$I_{dispat,max}(t+\Delta T) = I_{dispat,max} I_{step} \quad \text{Equation (4)}$$

In some embodiments, the battery life is gradually degraded through long-term operation. Therefore, in some embodiments, the battery management layer 806 operates on a minute or hourly time scale. By comparison, the real time real-time power management layer 804 operates on a seconds time scale.

Referring to FIG. 17, the real-time power management layer 804 coordinates the power flow among storage elements at each time instant. An optimization cost function is formulated. The optimization cost function takes the following objectives into consideration: system energy efficiency; ultracapacitor state of charge (SoC) regulation; and compliances to the internal storage elements' operation constraints.

The real time management layer 804 includes an instant real time optimization module 807, a system efficiency improvement module 808 and an ultracapacitor state of charge (SoC) regulation module 809. The instant real time optimization module 807 may include a total cost function as shown in Equation (5). Equation (5) consists of two parts, in which one part of the equation accounts for system efficiency improvement ($f_{cost,eff}$), the second other part of the equation accounts for UC SoC regulation ($f_{cost,soc}$). The presentations of these two factors are described in the following description of the system efficiency improvement module 808 and the ultracapacitor state of charge (SoC) regulation module 809.

Since the HESS operation usually needs to face the scenarios where the HESS power profile is random or unknown, the optimization of the cost function in Equation (5) is designed to compute at each time instant. The time stamp t is omitted for brevity.

$$\text{Min} f_{cost} = f_{cost,eff} + f_{cost,soc} \quad \text{Equation (5)}$$

The optimization constraints include the following parameters ((a)-(d)):
(a) State of charge (SoC) range of battery: $SoC_{bat,min} < SoC_{bat}(t) < SoC_{bat,max}$.
(b) State of charge (SoC) range of ultracapacitor (UC): $SoC_{uc,min} < SoC_{uc}(t) < SoC_{uc,max}$.
(c) Battery charging/discharging current: $-I_{disbat,max} < I_{batt}(t) < I_{chbat,max}$,
where $I_{disbat,max}$, $I_{chbat,max}$ are both positive value, while $I_{batt}(t)$ is bi-directional, positive for battery charging, and negative for battery discharging.
(d) Ultracapacitor (UC) charging/discharging current: $-I_{disuc,max} < I_{uc}(t) < I_{chuc,max}$, Where $I_{disuc,max}$, $I_{chuc,max}$ are both positive value, while $I_{uc}(t)$ is bi-directional, positive for UC charging, negative for UC discharging.
(e) Rate of change of battery current: $|I_{bat}(t) - I_{bat}(t+\Delta t)| < \Delta I_{bat,max}$,
(d) Power Balancing: $P'_{bat} + P'_{uc} = P_{DC}$, where $P'_{bat}$, $P'_{uc}$ are storage exchanged power over the DC bus.

In some embodiments, when there are multiple batteries or ultracapacitors exists in the hybrid system, the above constraint conditions can be constructed for each individual set.

In some embodiments, the system efficiency improvement module 808 the cost factor) related to system energy efficiency $f_{cost,eff}$ is defined as:

$$f_{costeff} = P_{bat,loss}(P_{batt}) + P_{uc,loss}(P_{uc}) + P_{conv,loss}(P_{uc}) + P_{conv,loss}(P_{batt}) \quad \text{Equation (6)}$$

The power loss includes the loss induced by the internal resistances of battery and ultracapacitor themselves, as well as the loss induced by their interfacing converters. $P_{batt}$ and $P_{uc}$ are the commanded battery and ultracapacitors (UC) power converted by converters 31 depicted in FIG. 18.

Figure 20A:
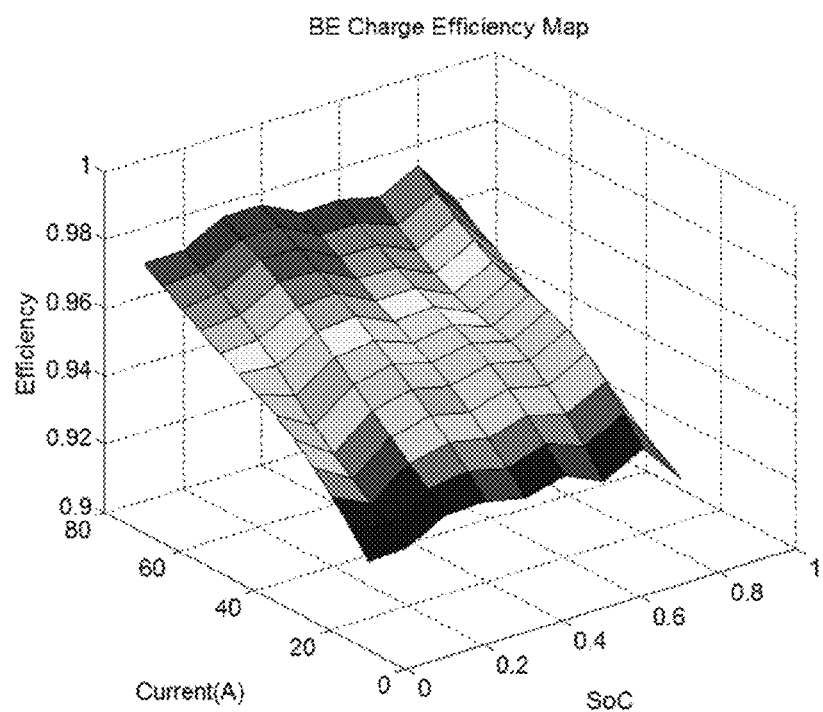
FIGS. 20A and 20B depict efficiency maps for providing a power loss model for use with at least one embodiment of the present disclosure.
Figure 20B:
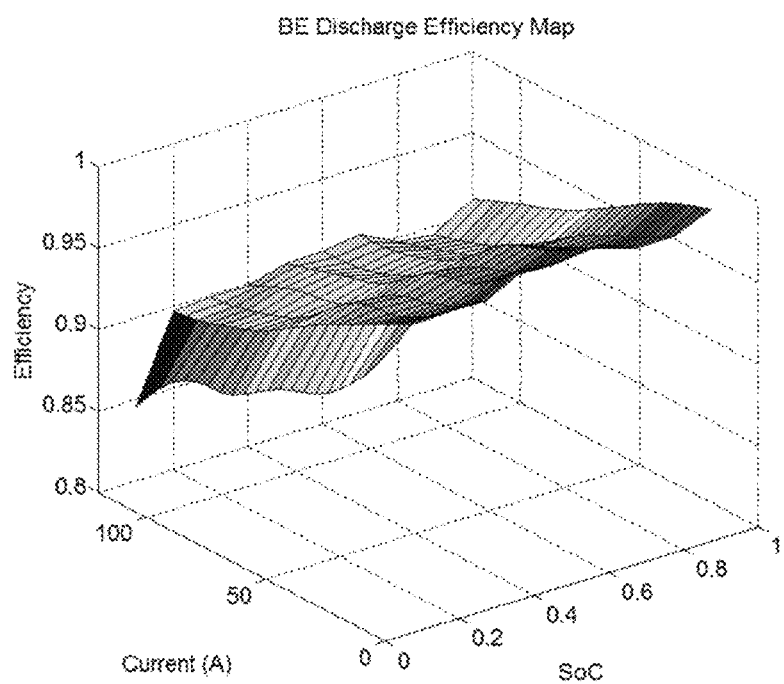

Equation 6, as employed by the system efficiency improvement module 808 depicted in FIG. 17, can be constructed through the power loss models of different components, e.g. battery 20, ultracapacitor 30, and converters 31, as depicted in FIG. 18. In some embodiments, the power loss model can be presented in different format, e.g. through detailed electrical circuit modeling of each component, or pre-calculated efficiency map as depicted in FIGS. 20A and 20B. FIG. 20A is a battery (BE) charge efficiency map. FIG. 20B is a battery (BE) discharge efficiency map. One method for constructing the efficiency map for these components, which is related to the $P_{conv,loss}(P)$, is explained in the following paragraphs.

For example, considering the DC-DC converters 31 depicted in FIG. 18 as an example, the power loss of converters interfacing the ultracapacitors 30 are related to capacitor current and capacitor voltage, assuming the DC-link voltage is constant. The efficiency map ($\eta_{conv,loss}$) of DC/DC converters can be pre-calculated or constructed through experiments, and stored as look-up table for real-time power loss calculation. The power loss from DC-DC converters $P_{conv,loss}(P)$ can be calculated as:

$$P_{conv,loss}(P_x) = \quad \text{Equation (7)}$$
$$P_x \times \eta_{conv} \text{ for storage discharging to DC bus}$$
$$P_{conv,loss}(P_x) = P_x \times \left(\frac{1}{\eta_{conv}} - 1\right) \text{ for}$$
$$\text{storage charging from DC bus,}$$

where x stands for ultracapacitor, or battery connected to DC-DC converter.

The ultracapacitor can be simply modeled as a capacitor in series connection with a small resistant, which is referred to as equivalent series resistant (ESR). Since the ESR can be easily obtained from manufacturer datasheet, the ultracapacitor discharging/charging efficiency can be described as the function of $V_{uc}$ and $I_{uc}$, in accordance with the following:

$$\eta_{uc,discharging} = \frac{U_{uc}}{U_{uc,o}} = 1 - \frac{I_{uc,discharging} \times ESR}{U_{uc,o}} \quad \text{Equation (8)}$$

$$\eta_{uc,charging} = \frac{U_{uco}}{U_{uc}} = 1 - \frac{I_{uc,charging} \times ESR}{U_{uc,o} + I_{uc,charging} \times ESR}$$

Where $V_{uc,o}$ is output voltage of the ultracapacitor, so the power loss $P_{uc,loss}(P_{uc})$ can be calculated as:

$$P_{uc,loss}(P_{uc}) = P_{uc}(1 - \eta_{uc,charging}) \text{ for ultracapacitor charging}$$

$$P_{uc,loss}(P_{uc}) = P_{uc}(1/\eta_{uc,discharging} - 1) \text{ for ultracapacitor discharging} \quad \text{Equation (9)}$$

In some embodiments, the battery may have different efficiency curves for the charging and discharging process. It can be complicated to model the battery charging/discharging efficiency curve. Not only does the battery efficiency depend on the current level, but also the state of charge (SoC) level: $\eta_{bat} = f(SoC, I_{bat})$. Usually accurate battery electric models are hard to obtain. In the proposed control framework of the methods and systems disclosed herein, an experiment-based battery efficiency map construction is suggested. The battery efficiency can be defined as:

$$\eta_{bat,discharge} = \frac{V_L}{V_{oc}} \quad \text{Equation (10)}$$

$$\eta_{bat,charge} = \frac{V_{oc}}{V_L}$$

where the $V_L$ is the battery terminal voltage which is the function of the battery load current, $V_{oc}$ is the battery open circuit voltage which is the function of battery SoC, Assuming the temperature is well maintained during system operation, the battery discharging/charging efficiency ($\eta_{bat,discharge}$ or $\eta_{bat,charge}$) is the function of (SoC, $I_{bat}$).

Through a series of battery charging/discharging experiment, the battery efficiency map based on the above equations can be obtained and stored for further use. Fig. x shows the examples of battery charging/discharging efficiency map. Then the power loss $P_{bat,loss}(P_{bat})$ can be calculated as:

$$P_{bat,loss}(P_{bat}) = P_{bat}(1 - \eta_{bat,charging}) \text{ for battery charging} \quad \text{Equation (11)}$$

$$P_{bat,loss}(P_{bat}) = P_{bat}\left(\frac{1}{\eta_{bat,discharging}} - 1\right) \text{ for battery discharging}$$

Block 809 of FIG. 17 represents the ultracapacitor state of charge (SoC) regulation module, in which the cost factor related to the ultracapacitor (UC) state of charge (SoC) regulation ($f_{cost,soc}$) by the following equation:

$$f_{cost,soc} = f(SoC_{UC})\omega(SoC_{UC})dSoC_{UC} \quad \text{Equation (12)}$$

Figure 21:
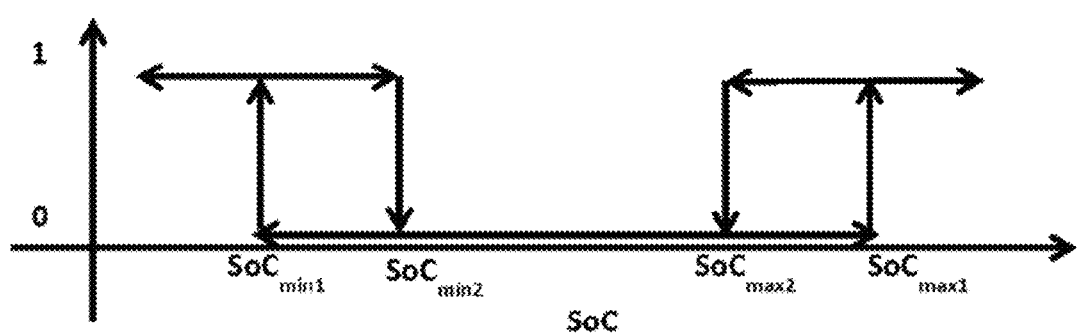
FIG. 21 depicts one embodiment of a plot of a hysteresis function for defining the activity of a state of charge (SOC) related cost fracture, in accordance with the present disclosure.

The function $f(SoC_{UC})$ defines the activity of the state of charge (SoC)-related cost factor. In some embodiments, it is defined as a hysteresis function as depicted in FIG. 21. When the SoC of UC is located in the normal range ($SoC_{min}$ ~$SoC_{max2}$), the factor $f(SoC_{UC})$ equals zero. In some embodiments, the system energy efficiency plays the major role in the total system cost function that can be solved using Equation (5).

The $\omega(SoC_{UC})$ is the weighting factor, and it varies with the state of charge for the ultracapacitor ($SoC_{UC}$). The more the state of charge (SoC) of ultracapacitor (UC) deviates from the normal range, the heavier the factor will be. The weighting factor $\omega$ for Equation (12) when $\omega$ in ($SoC_{max2}$~$SOC_{max1}$) may be provided by the following:

$$\omega = K\left(\frac{SoC_{Uc} - SoC_{max2}}{SoC_{max1} - SoC_{max2}}\right)^2 \quad \text{Equation (13)}$$

The weighing factor co for Equation (12) when $\omega$ in ($SoC_{min1}$~$SoC_{min2}$) may be provided by the following:

$$\omega = K\left(\frac{SoC_{Uc} - SoC_{min1}}{SoC_{min1} - SoC_{min1}}\right)^2 \quad \text{Equation (14)}$$

In further scenarios not meeting the above requirements, $\omega=0$. $dSoC_{UC}$ is the deviation of state of charge for the ultracapacitor (UC SoC) from the boundary.

Figure 22:
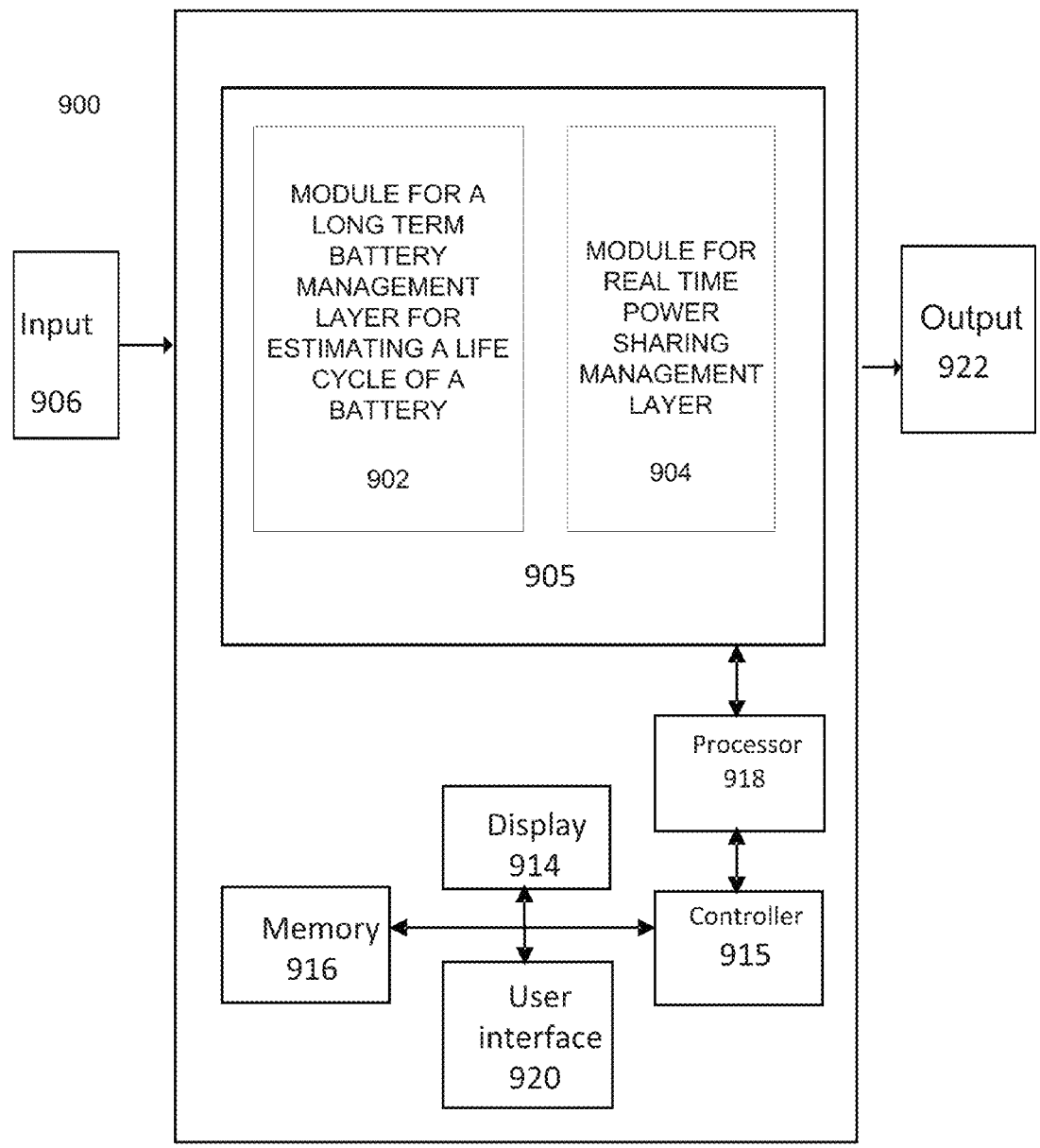
FIG. 22 is a schematic view of a hybrid storage system configuration to manage power between the multiple components of a hybrid electrical energy storage system (HESS), in accordance with the present disclosure.

In another aspect of the present disclosure, a hybrid energy storage system is provided that includes at least one battery storage element, at least one capacitor storage element, and a power management system for controlling power using a hardware processor through the battery storage element and the capacitor storage element. Referring to FIG. 22, the power management system 05 includes a module for the long term battery management layer 902 for estimating and managing a life cycle for the battery, and a module for the real time power management layer 904 for managing power sharing between the at least one battery storage element and the at least one capacitor storage element at each time instant dependent upon adjustments to battery performance based upon the long term battery management layer.

In one embodiment, the system 900 preferably includes one or more processors 918 and memory 916 for storing applications, modules and other data. In one example, the one or more processors 918 and memory 916 may be components of a computer, in which the memory may be random access memory (RAM), a program memory (preferably a writable read-only memory (ROM) such as a flash ROM) or a combination thereof. The computer may also include an input/output (I/O) controller coupled by a CPU bus. The computer may optionally include a hard drive controller, which is coupled to a hard disk and CPU bus. Hard disk may be used for storing application programs, such as some embodiments of the present disclosure, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link.

The system 900 may include one or more displays 914 for viewing. The displays 914 may permit a user to interact with the system 900 and its components and functions. This may be further facilitated by a user interface 920, which may include a mouse, joystick, or any other peripheral or control to permit user interaction with the system 900 and/or its devices, and may be further facilitated by a controller 915. It should be understood that the components and functions of the system 900 may be integrated into one or more systems or workstations. The display 914, a keyboard and a pointing device (mouse) may also be connected to I/O bus of the computer. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

The system 900 may receive input data 906 which may be employed as input to a plurality of modules 905 that provide the module for the long term battery management layer 902 for estimating and managing a life cycle for the battery, and the module for the real time power management layer 904 for managing power sharing between the at least one battery storage element and the at least one capacitor storage element. The system 900 may produce output data 922, which in one embodiment may be displayed on one or more display devices 514. It should be noted that while the above configuration is illustratively depicted, it is contemplated that other sorts of configurations may also be employed according to the present principles.

Further details regarding the modules 902, 904 for the long term battery management layer and the real time power management layer have been provided above with reference to FIGS. 16 and 17. With respect to the disclosure related to FIG. 17, the description of the long term battery life management layer depicted as block 803 (and related sub blocks 805, 806) can provide a further description of the functions provided by the module for the long term battery management layer 902 for estimating the life cycle for the battery. With respect to the disclosure related to FIG. 17, the description of the real time power management depicted by block 804 (and related sub blocks 807, 808, 809) can provide a further description of the functions provided by the module for the real time power management layer 904 for managing power sharing between the at least one battery storage element and the at least one capacitor storage element In some embodiments, the multi-layer multi-objective control framework for hybrid energy storage systems (HESS) that has been described above provides a general control framework of HESS for various applications, with no need for pre-known or predicted system power profile. In some embodiments, the multi-layer structure design disclosed herein reduces the computation complexity, easy for real-time implementation when compared with prior single integrated optimization approaches. The multiple control objectives are achieved, including of storage life management, system efficiency improvement, and the sustainable and safe operation of HESS. Additionally, various control objectives have been addressed herein on different control layers at different time scales, which follow the system operation and storage dynamic characteristics. Further, a battery life estimation model is included in this control framework that quantitatively manages the benefits of hybridization on battery life extension.

As described herein may be entirely hardware or may include both hardware and software elements, which includes but is not limited to firmware, resident software, microcode, etc. Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A hybrid energy storage system comprising:
at least one battery storage element;
at least one capacitor storage element; and
a power management system for controlling power using a hardware processor through the battery storage element and the capacitor storage element, the power management system comprising a long term battery management layer for estimating and managing a life cycle for the battery, and a real time power management layer for managing power sharing between the at least one battery storage element and the at least one capacitor storage element at each time instant dependent upon adjustments to battery performance based upon the long term battery management layer;
wherein the at least one capacitor storage element is an ultra-capacitor;
wherein the real time power management layer comprises an instant real time optimization module, an instant real time efficiency improvement module, and an ultra-capacitor state of charge regulation module;
wherein the instant real time optimization module comprises a total cost function:

$$\text{Min } f_{cost} - f_{cost,eff} + f_{cost,soc}$$

wherein, $f_{cost,eff}$ account for the system efficiency improvement and $f_{cost,soc}$ accounts for regulation of the state of charge for the at least one capacitor storage element, wherein constraints for the total cost function include at least one of a state of charge range for the at least one battery, a state of charge range for the ultra-capacitor, battery charging and discharging current, rate of change for the battery current, and power balancing.

2. The system of claim 1, wherein the long term battery management layer estimates the life cycle for the battery using depth of discharge and rate of discharge in the at least one battery storage element.

3. The system of claim 1, wherein said each time instant is on a seconds time scale.

4. The system of claim 1, wherein a maximum depth of discharge and a maximum discharging current that is provided by the long term battery management layer provide the constraints for optimization problems used in the real time power management layer for managing power sharing between the at least one battery storage element and the at least one capacitor storage element at each time instant.

5. The system of claim 1, wherein the instant real time efficiency improvement module introduces power losses that result from the internal resistance of the at least one battery and the capacitor, and loss induced by their interfacing converters to the total cost function.

6. The system of claim 5, wherein the ultracapacitor state of charge regulation module introduces a weighted state of charge of the ultracapacitor variable to the total cost function, wherein a weighing factor is dependent upon a degree upon which a measured state of charge for the ultracapacitor varies from a target value.

7. A method of controlling power in a hybrid energy storage system comprising:
providing at least one battery storage element and at least one capacitor storage element; and
controlling power through the at least one battery storage element and the capacitor storage element using a multi-level power management system comprising at least a long term battery management layer for estimating a life cycle for the battery, and a real time power management layer for managing power sharing between the at least one battery storage element and the at least one capacitor storage element at each time instant dependent upon adjustments to battery performance based upon the long term battery management layer;
wherein the at least one capacitor storage element is an ultra-capacitor;
wherein the long term battery management layer estimates the life cycle for the battery using depth of discharge and rate of discharge in the at least one battery storage element;
wherein the real time power management layer comprises an instant real time optimization module, an instant real time efficiency improvement module, and an ultra-capacitor state of charge module;

wherein the instant real time optimization module comprises a total cost function:

$$\text{Min } f_{cost} = f_{cost,eff} + f_{cost,soc}$$

wherein, $f_{cost,eff}$ accounts for the system efficiency improvement and $f_{cost,soc}$ accounts for regulation of the state of charge for the at least one capacitor storage element, wherein constraints for the total cost function include at least one of a state of charge range for the at least one battery, a state of charge range for the ultracapacitor, battery charging and discharging current, rate of change for the battery current, and power balancing.

8. The method claim 7, wherein said each time instant ranges from a minute time scale to an hourly time scale.

9. The method of claim 7, wherein a maximum depth of discharge and a maximum discharging current that is provided by the long term battery management layer provide the constraints for optimization problems used in the real time power management layer for managing power sharing between the at least one battery storage element and the at least one capacitor storage element at each time instant.

10. The method of claim 7, wherein the instant real time efficiency improvement module introduces power losses that result from the internal resistance of the at least one battery and the capacitor, and loss induced by their interfacing converters to the total cost function.

11. The method of claim 10, wherein the ultracapacitor state of charge regulation module introduces a weighted state of charge of the ultracapacitor variable to the total cost function, wherein a weighing factor is dependent upon a degree upon which a measured state of charge varies from a target value.

* * * * *